US012577460B2

(12) United States Patent
Schulte et al.

(10) Patent No.: US 12,577,460 B2
(45) Date of Patent: *Mar. 17, 2026

(54) COMPOSITION FOR PRODUCTION OF COATINGS COMPRISING IMPROVED PHOSPHORS

(71) Applicant: Evonik Operations GmbH, Essen (DE)

(72) Inventors: Simone Schulte, Essen (DE); Markus Hallack, Schermbeck (DE); Christina Janke, Essen (DE); Sabine Krusenbaum, Essen (DE); Bärbel Wolff, Moers (DE); Thomas Jüstel, Witten (DE); Stefan Fischer, Soest (DE); Franziska Schröder, Steinfurt (DE); Sven Reetz, Gronau (DE); Michael Huth, Maintal (DE)

(73) Assignee: Evonik Operations GmbH, Essen (DE)

( * ) Notice: Subject to any disclaimer, the term of this patent is extended or adjusted under 35 U.S.C. 154(b) by 936 days.

This patent is subject to a terminal disclaimer.

(21) Appl. No.: 17/658,681

(22) Filed: Apr. 11, 2022

(65) Prior Publication Data

US 2022/0325177 A1     Oct. 13, 2022

(30) Foreign Application Priority Data

Apr. 13, 2021    (EP) ..................................... 21167984

(51) Int. Cl.
| | |
|---|---|
| *C09D 7/61* | (2018.01) |
| *C09D 5/14* | (2006.01) |
| *C09D 5/22* | (2006.01) |
| *C09D 175/04* | (2006.01) |
| *C09K 11/77* | (2006.01) |
| *C08K 3/36* | (2006.01) |

(52) U.S. Cl.
CPC .......... *C09K 11/77062* (2021.01); *C09D 5/14* (2013.01); *C09D 5/22* (2013.01); *C09D 7/61* (2018.01); *C09D 175/04* (2013.01); *C08K 3/36* (2013.01)

(58) Field of Classification Search
CPC ...... C09K 11/77062; C09K 3/36; C09D 7/61; C09D 5/14; C09D 5/22; C09D 175/04
USPC ....................................................... 524/442
See application file for complete search history.

(56) References Cited

U.S. PATENT DOCUMENTS

| | | | |
|---|---|---|---|
| 6,794,445 | B2 | 9/2004 | Reusmann et al. |
| 9,266,825 | B2 | 2/2016 | Lomoelder et al. |
| 9,617,390 | B2 | 4/2017 | Hinzmann et al. |
| 9,663,622 | B2 | 5/2017 | Hinzmann et al. |
| 9,796,876 | B2 | 10/2017 | Lomoelder et al. |
| 9,902,095 | B2 | 2/2018 | Stapperfenne et al. |
| 9,902,096 | B2 | 2/2018 | Stapperfenne et al. |
| 10,100,207 | B2 | 10/2018 | Stache et al. |
| 10,239,898 | B2 | 3/2019 | Hallack et al. |
| 10,626,291 | B2 | 4/2020 | Hallack et al. |
| 10,633,555 | B2 | 4/2020 | Stache et al. |
| 11,021,608 | B2 | 6/2021 | Seyfried et al. |
| 11,254,819 | B2 | 2/2022 | Hallack et al. |
| 11,713,400 | B2 | 8/2023 | Schulte et al. |
| 2003/0198819 | A1 | 10/2003 | Reusmann et al. |
| 2006/0108910 | A1 | 5/2006 | Justel et al. |
| 2007/0203307 | A1 | 8/2007 | Cavaleiro et al. |
| 2009/0130169 | A1 | 5/2009 | Bernstein |
| 2011/0171062 | A1 | 7/2011 | Wolfe |
| 2013/0224071 | A1 | 8/2013 | Bernstein |
| 2015/0191625 | A1 | 7/2015 | Lomoelder et al. |
| 2015/0203749 | A1 | 7/2015 | Komukai et al. |
| 2015/0225337 | A1 | 8/2015 | Lomoelder et al. |
| 2015/0321392 | A1 | 11/2015 | Stapperfenne et al. |
| 2015/0321393 | A1 | 11/2015 | Stapperfenne et al. |
| 2016/0017165 | A1 | 1/2016 | Numrich et al. |
| 2016/0108280 | A1 | 4/2016 | Hallack et al. |
| 2016/0185918 | A1 | 6/2016 | Hinzmann et al. |
| 2016/0222169 | A1 | 8/2016 | Hinzmann et al. |

(Continued)

FOREIGN PATENT DOCUMENTS

| | | |
|---|---|---|
| CN | 1678713 A | 10/2005 |
| CN | 103865538 A | 6/2014 |

(Continued)

OTHER PUBLICATIONS

U.S. Appl. No. 11/677,821, filed Feb. 22, 2007, 2007/0203307, Cavaleiro et al.
U.S. Appl. No. 14/772,019, filed Sep. 1, 2015, 2016/0017165, Numrich et al.
U.S. Appl. No. 15/510,282, filed Mar. 10, 2017, 2017/0298250, Anselmann et al.
U.S. Appl. No. 16/142,408, filed Sep. 26, 2018, 2019/0112502, Sloot et al.

(Continued)

*Primary Examiner* — Kelechi C Egwim
(74) *Attorney, Agent, or Firm* — Grüneberg Global IP, PLLC

(57) ABSTRACT

A curable composition for production of coatings having an antimicrobial property, contains at least one film-forming polymer, optionally at least one additive and/or at least one curing agent, and at least one up-conversion phosphor of the general formula (I): $A_{1-x-y-z}B^*_yB_2SiO_4:Ln^1_x,Ln^2_z$. In the general formula (I), x=0.0001-0.0500; z=0.0000 or z=0.0001 to 0.3000 with the proviso that: y=x+z; A is selected from Mg, Ca, Sr and Ba; B is selected from Li, Na, K, Rb and Cs; B* is selected from Li, Na and K; and preferably B and B* are not the same. Additionally, $Ln^1$ is selected from praseodymium (Pr), erbium (Er), and neodymium (Nd); and $Ln^2$ is gadolinium (Gd). The phosphor has been prepared using at least one halogen-containing flux.

29 Claims, 7 Drawing Sheets

(56)            References Cited

U.S. PATENT DOCUMENTS

| 2016/0297974 | A1 | 10/2016 | Stache et al. |
| 2017/0298250 | A1 | 10/2017 | Anselmann et al. |
| 2018/0179234 | A1 | 6/2018 | Hallack et al. |
| 2019/0048224 | A1 | 2/2019 | Stache et al. |
| 2019/0112502 | A1 | 4/2019 | Sloot et al. |
| 2019/0241741 | A1 | 8/2019 | Seyfried et al. |
| 2020/0308406 | A1 | 10/2020 | Seyfried et al. |
| 2021/0030372 | A1 | 2/2021 | Lizio et al. |
| 2021/0122921 | A1 | 4/2021 | Hallack et al. |
| 2021/0144994 | A1 | 5/2021 | Winkler et al. |
| 2021/0253889 | A1 * | 8/2021 | Schulte .............. C09D 175/06 |
| 2021/0403753 | A1 | 12/2021 | Schulte et al. |
| 2022/0041887 | A1 | 2/2022 | Roland et al. |
| 2022/0049362 | A1 | 2/2022 | Hallack et al. |
| 2022/0177652 | A1 | 6/2022 | De Gans et al. |
| 2022/0325176 | A1 | 10/2022 | Schulte et al. |
| 2022/0403239 | A1 | 12/2022 | Fischer et al. |
| 2023/0295495 | A1 | 9/2023 | Schulte et al. |
| 2023/0295496 | A1 | 9/2023 | Schulte et al. |

FOREIGN PATENT DOCUMENTS

| DE | 10 2015 102 427 | 5/2016 |
| EP | 2 415 848 | 2/2012 |
| EP | 4 011 992 | 6/2022 |
| EP | 4 015 592 | 6/2022 |
| JP | 2004-107612 A | 4/2004 |
| JP | 2008-95091 | 4/2008 |
| JP | 2009-517525 A | 4/2009 |
| JP | 2013-515137 A | 5/2013 |
| JP | 2013-129765 A | 7/2013 |
| JP | 2017-502965 A | 1/2017 |
| JP | 2020-37637 A | 3/2020 |
| WO | 2005/100482 | 10/2005 |
| WO | 2009/064845 | 5/2009 |
| WO | 2014/135353 | 9/2014 |
| WO | 2018/001889 | 1/2018 |
| WO | 2019/197076 | 10/2019 |
| WO | 2021/073914 | 4/2021 |
| WO | 2021/073915 | 4/2021 |
| WO | 2021/249850 | 12/2021 |

OTHER PUBLICATIONS

U.S. Appl. No. 16/834,781, filed Mar. 30, 2020, 2020/0308406, Seyfried et al.

U.S. Appl. No. 17/045,910, filed Oct. 7, 2020, 2021/0030372, Lizio et al.

U.S. Appl. No. 17/176,922, filed Feb. 16, 2021, 2021/0253889, Schulte et al.

U.S. Appl. No. 17/395,616, filed Aug. 6, 2021, 2022/0041887, Roland et al.

U.S. Appl. No. 17/355,385, filed Jun. 23, 2021, 2021/0403753, Schulte et al.

U.S. Appl. No. 17/399,171, filed Aug. 11, 2021, 2022/0049362, Hallack et al.

Extended European Search Report dated Sep. 30, 2021 in European Patent Application No. 21167984.0, 8 pages.

Kang et al., "Eu-doped barium strontium silicate phosphor particles prepared from spray solution containing $NH_4Cl$ flux by spray pyrolysis", Materials Science and Engineering, vol. 121, 2005, pp. 81-85.

European Search Report dated Sep. 28, 2022, in European Application No. 22164426.3, 9 pages.

Yin et al, "Pr3+ doped Li2SrSiO4: an efficient visible-ultraviolet C up-conversion phosphor", Ceramics International, vol. 47, 2021, pp. 4858-4863.

Office Action received for U.S. Appl. No. 17/754,783, mailed on Aug. 12, 2025, 16 pages.

Office Action issued in Chinese Patent Application No. 202210385685.0 on May 23, 2025, 22 pages, with English translation.

Office action issued in Japanese Patent Application No. 2022-062370 on Dec. 5, 2025 (with English machine translation), 8 pages.

Office Action received for U.S. Appl. No. 17/754,783, mailed on Apr. 22, 2025, 17 pages.

U.S. Appl. No. 17/754,783, filed Apr. 12, 2022, 2022/0403239, Fischer et al.

* cited by examiner $CaLi_2SiO_4:Pr^{3+},Na^+(1\%)$ $CaLi_2SiO_4:Pr^{3+},Na^+(1\%)$ 10 mol% NaF

COMPOSITION FOR PRODUCTION OF COATINGS COMPRISING IMPROVED PHOSPHORS

CROSS-REFERENCE TO RELATED APPLICATIONS

This application claims priority to European Application No. 21167984.0, filed on Apr. 13, 2021, the content of which is hereby incorporated by reference in its entirety.

BACKGROUND OF THE INVENTION

Field of the Invention

The invention relates to a curable composition for the production of coatings having an antimicrobial property, to the use thereof and to coatings produced therefrom and articles coated therewith.

Description of Related Art

Every day, humans are exposed to millions of microorganisms such as bacteria, fungi and viruses. Many of these microorganisms are useful or even necessary. Nevertheless, as well as these less harmful representatives, there are also disease-causing or even deadly bacteria, fungi and viruses.

Microorganisms can be transmitted through daily interaction with other people and contact with articles that have been used by others. Surfaces are given an antimicrobial finish especially in hygiene-sensitive areas. Fields of use are in particular surfaces of medical devices and consumer articles in hospitals, and in outpatient health and welfare facilities. In addition to these, there are surfaces in the public sphere, in the food and drink sector and in animal keeping. The spread of pathogenic microorganisms is a great problem nowadays in the care sector and in medicine, and wherever humans associate in an enclosed space. A particular risk at present is the increased occurrence of what are called multiresistant germs that have become insensitive to standard antibiotics.

In order to reduce the risk of spread of pathogens via contact surfaces, in addition to standard hygiene measures, antimicrobial technologies and materials are being utilized. Chemical substances or the use of physical methods can have a critical influence on the process of propagation of microorganisms. The physical methods include, for example, heat, cold, radiation or ultrasound, etc. Among the chemical methods, halogens, metal ions, organic compounds and dyes, toxic gases, etc., are known.

Even though chemical and physical methods are extremely effective in the destruction of microorganisms in most cases, they have only a short-lived effect, chemical methods promote the development of resistances and are unsuitable for some applications under some circumstances since they lead to destruction of the surfaces to be protected. The greatest disadvantage, however, specifically in the case of chemical organic substances, is the hazard or toxicity to man. Particular substances, for example formaldehyde, which found use as disinfectant for many years, are now suspected of causing cancer or of being extremely harmful to the environment.

Surfaces with antimicrobial action can make a crucial contribution to the solution of these problems. The standard processes nowadays for generation of such antimicrobial properties make use predominantly of active ingredients incorporated into the material, for example silver particles, copper particles, metal oxides thereof or quaternary ammonium compounds. This frequently involves processing the antimicrobial metals, metal oxides or metal oxide mixtures to give nanoparticles and then mixing them into paints, coatings or polymer materials. The broad use of metal particles is questionable since it is barely possible to assess the long-term effect of this heavy metal on man and the environment.

For example, WO 2019/197076 discloses particles finished with a layer containing both antimony tin oxide and manganese oxide. The person skilled in the art is aware that the antimicrobial surfaces are produced on account of the electrochemical characteristics of metals which, in the presence of moisture, develop microscale galvanic cells and, by virtue of the microscale electrical fields, germ-killing action.

It is likewise known that UV radiation can be used in medicine or in hygiene, in order, for example, to disinfect water, gases or surfaces. For instance, UV radiation has long been used in drinking water treatment to reduce the number of facultatively pathogenic microorganisms in the water. This is preferably done using UV-C radiation in the wavelength range between 200 nm and 280 nm. The use of electromagnetic radiation with different wavelengths should take account of the different absorption of the different proteins, the amino acids/nucleic acids (e.g. DNA or RNA) present in microorganisms, tissues or cells, and peptide bonds between the individual acids. For instance, DNA/RNA has good absorption of electromagnetic radiation in the wavelength range between 200 nm and 300 nm, and particularly good absorption between 250 nm and 280 nm, and so this radiation is particularly suitable for inactivation of DNA/RNA. It is thus possible to inactivate pathogenic microorganisms (viruses, bacteria, yeasts, moulds inter alia) with such irradiation. Depending on the duration and intensity of the irradiation, the structure of DNA or RNA can be destroyed. Thus, metabolically active cells are inactivated and/or their capacity for propagation can be eliminated. What is advantageous about irradiation with UV radiation is that the microorganisms are unable to develop resistance thereto. However, these physical methods require specific apparatuses and generally have to be repeated regularly by trained personnel, which makes it difficult for these methods to be used widely.

Furthermore, as well as direct irradiation with electromagnetic radiation from the wavelength range of UV radiation, the exploitation of the "up-conversion" effect is also known. This uses phosphor particles with which electromagnetic radiation having wavelengths above UV radiation, especially visible light or infrared radiation, can be converted to electromagnetic radiation having shorter wavelength, such that it is possible to achieve the emission of radiation having the desired effect by the individual phosphor particles.

DE 10 2015 102 427 relates to a body that emits electromagnetic radiation in the wavelength range of UV light. Phosphor particles are embedded in the body in a near-surface region within the material from which the body is formed or in a coating on the body. All that is stated here in general terms is that the phosphor particles are added directly to a coating to be formed on the material in the course of processing, where the particular material should have a suitable consistency or viscosity. DE 10 2015 102 427 is silent with regard to suitable polymers and additives.

US 2009/0130169 A1 and WO 2009/064845 A2 describe phosphors that can be introduced into polyvinyl chlorides, acryloylbutadienes, polyolefins, polycarbonates, polystyrenes or nylon, which kill pathogenic microorganisms by virtue of the up-conversion property of the phosphors. These are phosphors that are prepared at a temperature of 1800-2900° C. While US 2009/0130169 A1 and WO 2009/064845 A2 do disclose a composition comprising said phosphors having an asserted antimicrobial action, they do not demonstrate either evidence of the up-conversion property or microbiological experiments. The process disclosed in these documents does not result in a phosphor having an up-conversion property, but instead in an amorphous and glass-like product.

Moreover, US 2009/0130169 A1 and WO 2009/064845 A2 are silent as regards the compatibility of the component in the coating composition and the properties of the coating surfaces, such as the paint surfaces, for example. However, the appearance of coating surfaces is paramount for the consumer.

The demands on coatings and paints are diverse. In principle, coating layers or paint coatings have two tasks or functions: the protective and the decorative function. If merely the term "coating layer" should be stated below, both types of coating are intended. They decorate, protect and preserve materials such as wood, metal or plastic. Accordingly, bright and glossy coat layers are required on the one hand, and a continuous coat layer on the other hand for assurance of chemical and mechanical stability, a certain glide over the coatings or a particular feel.

In contrast to WO 2009/064845 A2, the as-yet unpublished patent applications EP 19202910.6 and PCT/EP2020/077798 disclose phosphors exhibiting up-conversion and the preparation thereof. Such phosphors can convert electromagnetic radiation having lower energy and longer wavelength in the range from 2000 nm to 400 nm, in particular in the range from 800 nm to 400 nm, to electromagnetic radiation having higher energy and shorter wavelength in the range from 400 nm to 100 nm, preferably in the range from 300 nm to 200 nm, with the result that they are suitable for use as antimicrobial phosphors in coating layers.

For instance, the as-yet unpublished European patent application EP 21157055.1 describes a composition comprising at least one film-forming polymer, at least one up-conversion phosphor according to the teaching of EP 19202910.6 and PCT/EP2020/077798, optionally at least one additive and optionally at least one curing agent. It was shown that coating layers comprising these phosphors have antimicrobial action without the other properties, in particular the storage stability, being significantly impaired.

However, it was also found that the phosphors prepared by a process according to EP 19202910.6 and PCT/EP2020/077798 exhibit an inhomogeneous particle size distribution, which presents a particular challenge when incorporating these phosphors into a coating matrix. Even though the teaching of EP 21157055.1 leads to antimicrobial coating layers, it would additionally be desirable to be able to increase the intensity of the emission of the phosphors.

SUMMARY OF THE INVENTION

Accordingly, the object of the invention is to provide a curable composition of the type mentioned at the outset, which can be used to produce coatings which provide protection against microorganisms, wherein up-conversion phosphors are used which have a homogeneous particle size distribution and in addition exhibit a higher intensity of the emission.

Based on the teaching of the European patent applications EP 19202910.6, PCT/EP2020/077798 and EP 21157055.1, the present invention proposes a curable composition for the production of coatings having an antimicrobial property, comprising at least one film-forming polymer,
optionally at least one additive,
optionally at least one curing agent,
at least one up-conversion phosphor of the general formula (I)

$$A_{1-x-y-z}B^*_yB_2SiO_4: Ln^1_x,Ln^2_z, \hspace{2cm} I$$

with
x=0.0001-0.0500;
z=0.0000 or z=0.0001 to 0.3000 with the proviso that:
y=x+z;
A being selected from the group consisting of Mg, Ca, Sr and Ba;
B being selected from the group consisting of Li, Na, K, Rb and Cs;
B* being selected from the group consisting of Li, Na and K, where B is the same as B* or B is not the same as B*, and preferably B and B* are not the same;
$Ln^1$ being selected from the group consisting of praseodymium (Pr), erbium (Er) and neodymium (Nd);
$Ln^2$ being selected from gadolinium (Gd),
wherein the phosphor has been prepared using at least one halogen-containing flux.

The invention also includes the following embodiments:

1. Curable composition for the production of coatings having an antimicrobial property, comprising
   at least one film-forming polymer,
   optionally at least one additive,
   optionally at least one curing agent,
   at least one up-conversion phosphor of the general formula (I)

$$A_{1-x-y-z}B^*_yB_2SiO_4: Ln^1_x,Ln^2_z, \hspace{2cm} I$$

with
   x=0.0001-0.0500;
   z=0.0000 or z=0.0001 to 0.3000 with the proviso that:
   y=x+z;
   A being selected from the group consisting of Mg, Ca, Sr and Ba;
   B being selected from the group consisting of Li, Na, K, Rb and Cs;
   B* being selected from the group consisting of Li, Na and K, where B is the same as B* or B is not the same as B*, and preferably B and B* are not the same;
   $Ln^1$ being selected from the group consisting of praseodymium (Pr), erbium (Er) and neodymium (Nd);
   $Ln^2$ being selected from gadolinium (Gd),
   wherein the phosphor has been prepared using at least one halogen-containing flux.
2. Composition according to embodiment 1, characterized in that the flux used is at least one substance from the group of the ammonium halides, alkali metal halides, alkaline earth metal halides and lanthanoid halides.
3. Composition according to either of the preceding embodiments, characterized in that the halides are fluorides, bromides or chlorides.
4. Composition according to any of the preceding embodiments, characterized in that the alkali metals are sodium or lithium.
5. Composition according to any of the preceding embodiments, characterized in that the lanthanoid is praseodymium.

6. Composition according to any of the preceding embodiments, characterized in that the alkaline earth metal is calcium.

7. Composition according to any of the preceding embodiments, characterized in that the phosphor has been doped with praseodymium.

8. Composition according to any of the preceding embodiments, characterized in that the phosphor has been doped with praseodymium and co-doped with gadolinium.

9. Composition according to any of the preceding embodiments, characterized in that the phosphor is a crystalline silicate or consists of crystalline silicates doped with lanthanoid ions, comprising at least one alkali metal ion and at least one alkaline earth metal ion, preferably in that the crystalline silicate has been doped with praseodymium and optionally co-doped with gadolinium.

10. Composition according to any of the preceding embodiments, characterized in that the phosphor is at least partially crystalline.

11. Composition according to any of the preceding embodiments, characterized in that the phosphor is selected from compounds of the general formula (Ia)

$$A_{1-x-y-z}B^*_yB_2SiO_4{:}Pr_x,Gd_z. \quad\quad Ia$$

with A being selected from the group consisting of Mg, Ca, Sr, Ba;

B being selected from the group consisting of Li, Na, K, Rb and Cs;

B* being selected from the group consisting of Li, Na and K, where B is the same as B* or B is not the same as B*, and preferably B and B* are not the same;

x=0.0001-0.0500;

z=0.0000 or z=0.0001 to 0.3000 with the proviso that:
y=x+z.

12. Composition according to any of the preceding embodiments, characterized in that the phosphor is selected from compounds of the general formula (II)

$$(Ca_{1-a}Sr_a)_{1-2b}Ln_bNa_bLi_2SiO_4 \quad\quad II$$

where:

Ln is selected from the group consisting of praseodymium, gadolinium, erbium, neodymium, preferably praseodymium;

a=0.0000 to 1.0000, preferably 0.0000 to 0.1000, especially 0.0000;

b=0.0001 to 0.5000, preferably 0.0001 to 0.1000, especially 0.0050 to 0.0500.

13. Composition according to any of the preceding embodiments, characterized in that the phosphor is selected from compounds of the general formula (IIa)

$$Ca_{1-2b}Pr_bNa_bLi_2SiO_4 \quad\quad (IIa)$$

with b=0.0001 to 0.5000, preferably 0.0001 to 0.1000, especially 0.0050 to 0.0500.

14. Composition according to any of the preceding embodiments, characterized in that the phosphor is $Ca_{0.98}Pr_{0.01}Na_{0.01}Li_2SiO_4$ or $Ca_{0.94}Pr_{0.03}Na_{0.03}Li_2SiO_4$.

15. Composition according to any of the preceding embodiments, characterized in that the phosphor includes a halogen, corresponding to the halide of the flux.

16. Composition according to any of the preceding embodiments, characterized in that the phosphor which, on irradiation with electromagnetic radiation having lower energy and longer wavelength in the range from 2000 nm to 400 nm, especially in the range from 800 nm to 400 nm, emits electromagnetic radiation having higher energy and shorter wavelength in the range from 400 nm to 100 nm, preferably in the range from 300 nm to 200 nm, where the intensity of the emission maximum of the electromagnetic radiation having higher energy and shorter wavelength is an intensity of at least $1{\cdot}10^3$ counts/(mm$^2$*s), preferably higher than $1{\cdot}10^4$ counts/(mm$^2$*), particularly preferably higher than $1{\cdot}10^5$ counts/(mm$^2$*s).

17. Composition according to any of the preceding embodiments, characterized in that the phosphor according to formula (II) has XRPD signals in the range from 23° 2θ to 27° 2θ and from 34° 2θ to 39.5° 2θ.

18. Composition according to any of the preceding embodiments, characterized in that the film-forming polymer contains functional groups, preferably acidic hydrogens, that are reactive with an isocyanate-containing curing agent or with a catalyst.

19. Composition according to any of the preceding embodiments, characterized in that the film-forming polymer is selected from the group of the hydroxy-functional acrylate polymers, hydroxy-functional polyester polymers, and/or hydroxy-functional polyether polymers, hydroxy-functional cellulose derivatives, amino-functional aspartic polymers or polyester polymers, which reacts with an isocyanate-containing curing agent.

20. Composition according to any of the preceding embodiments, characterized in that the film-forming polymer has low resonance.

21. Composition according to any of the preceding embodiments, characterized in that the transmittance of the film-forming polymer is at least 75%, preferably at least 80% and particularly preferably at least 85%, by means of a twin-beam UV/VIS spectrometer.

22. Composition according to any of the preceding embodiments, characterized in that transmittance is at least 70%, preferably at least 75% and particularly preferably at least 80%, by means of a twin-beam UV/VIS spectrometer.

23. Composition according to any of the preceding embodiments, characterized in that the phosphor has an average particle size of d50=0.1-50 μm, preferably d50=0.1-μm, particularly preferably d50=0.1 μm-5 μm, measured to ISO 13320:2020 and USP 429.

24. Composition according to any of the preceding embodiments, characterized in that the additives are selected from the group of the dispersants, rheology aids, levelling agents, wetting agents, defoamers and UV stabilizers.

25. Composition according to any of the preceding embodiments, characterized in that the curing agent is selected from the group of the aliphatic and cycloaliphatic isocyanates.

26. Composition according to any of the preceding embodiments, characterized in that coatings produced therefrom have antimicrobial action against bacteria, yeasts, moulds, algae, parasites and viruses.

27. Composition according to any of the preceding embodiments, characterized in that coatings produced therefrom have antimicrobial action against
pathogens of nosocomial infections, preferably against *Enterococcus faecium, Staphylococcus aureus, Klebsiella pneumoniae, Acinetobacter baumannii,*

7

*Pseudomonas aeruginosa, Escherichia coli, Entero-
bacter, Corynebacterium diphtheriae, Candida albi-
cans*, rotavirus, bacteriophages;
pathogenic environmental organisms, preferably
against *Cryptosporidium parvum, Giardia lamblia*,
amoebas (*Acanthamoeba* spp., *Naegleria* spp.), *E.
coli*, coliform bacteria, faecal streptococci, *Salmo-
nella* spp., *Shigella* spp., *Legionella* spec.,
*Pseudomonas aeruginosa, Mycobacterium* spp.,
enteral viruses (e.g. polio and hepatitis A virus);
pathogens in food and drink, preferably against *Bacil-
lus cereus, Campylobacter* spp., *Clostridium botuli-
num, Clostridium perfringens, Cronobacter* spp., *E.
coli, Listeria monocytogenes, Salmonella* spp.,
*Staphylococcus aureus, Vibrio* spp., *Yersinia entero-
colitica*, bacteriophages.

28. Use of the composition according to any of the
preceding embodiments for the production of disper-
sions, millbases, adhesives, trowelling compounds,
renders, paints, coatings or printing inks, inkjets, grind-
ing resins or pigment concentrates.
29. Use of the composition according to any of embodi-
ments 1 to 27 for the production of coatings having an
antimicrobial property.
30. Use of the composition according to any of embodi-
ments 1 to 27 for coating of substrates in hygiene
facilities and hospitals and in the food and drink
industry.
31. Process for forming an antimicrobial coating on a
substrate, comprising the application of a curable film-
forming composition to the substrate, comprising:
  (a) at least one film-forming polymer containing func-
  tional groups which are reactive with an isocyanate-
  containing curing agent, optionally catalysed by a
  catalyst,
  (b) at least one phosphor of the formula (II) and
  (c) a curing agent containing isocyanate-functional
  groups.
32. Process according to embodiment 31, wherein the
substrate comprises metal, mineral substrates, cellu-
losic substrates, wood and hybrids thereof, dimension-
ally stable plastics and/or thermosets.
33. Process according to either of embodiments 31-32,
wherein a primer composition is applied to the sub-
strate prior to the application of the curable film-
forming composition.
34. Article, characterized in that it has been coated at least
partly, preferably fully, with the curable composition
according to any of embodiments 1 to 27.

8

Figure 2A:
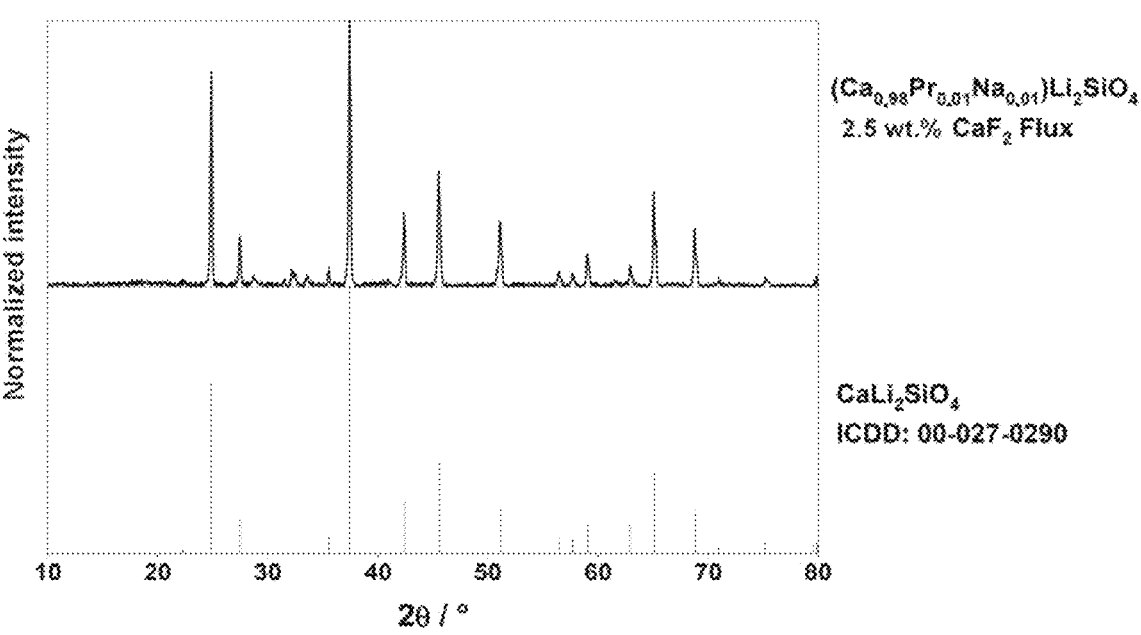
FIG. 2A shows an X-ray powder diffractogram (X-ray
diffraction pattern) of the phosphor from Example 2 (top)
compared to a non-fluxed reference phosphor (bottom nor-
malized X-ray diagram).
Figure 2B:
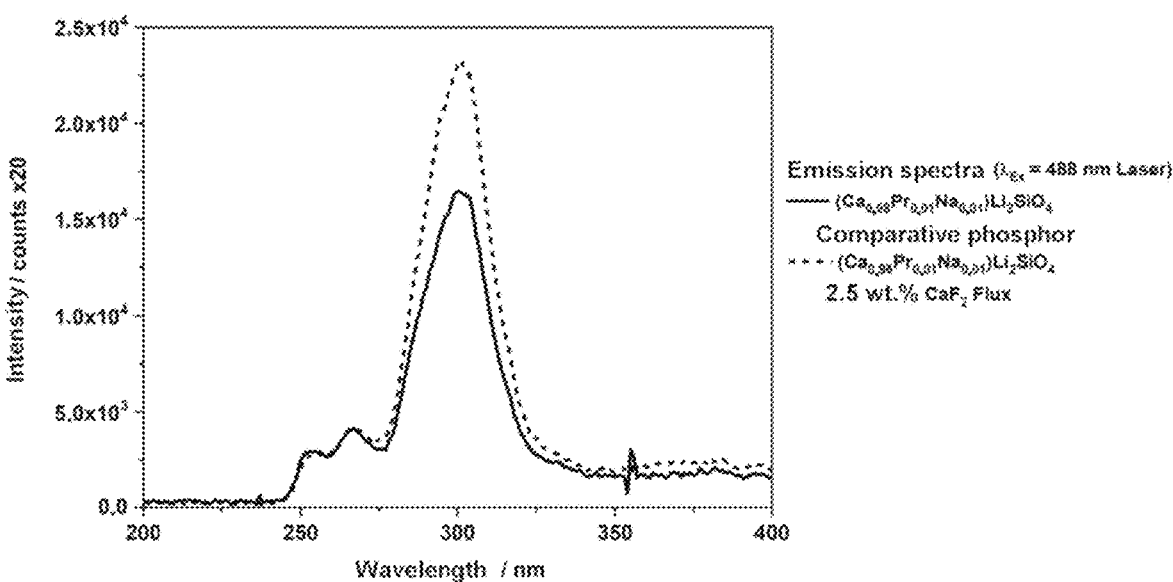
FIG. 2B shows an emission spectrum of Example 2
(dashed line) compared to a comparative phosphor which
has not been fluxed with $CaF_2$.
Figure 2C:
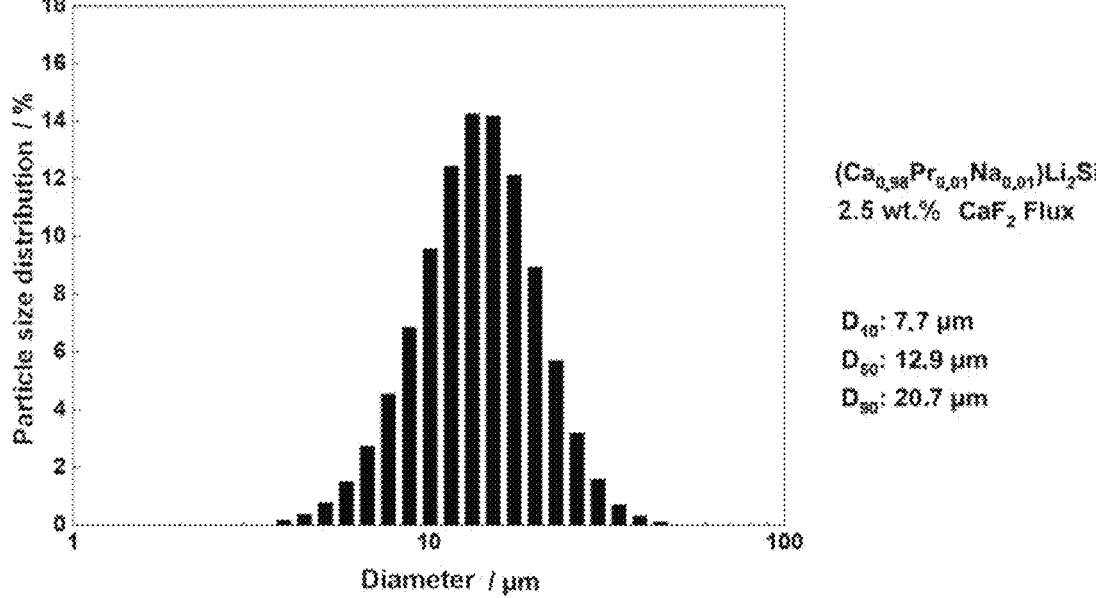
Figure 2D:
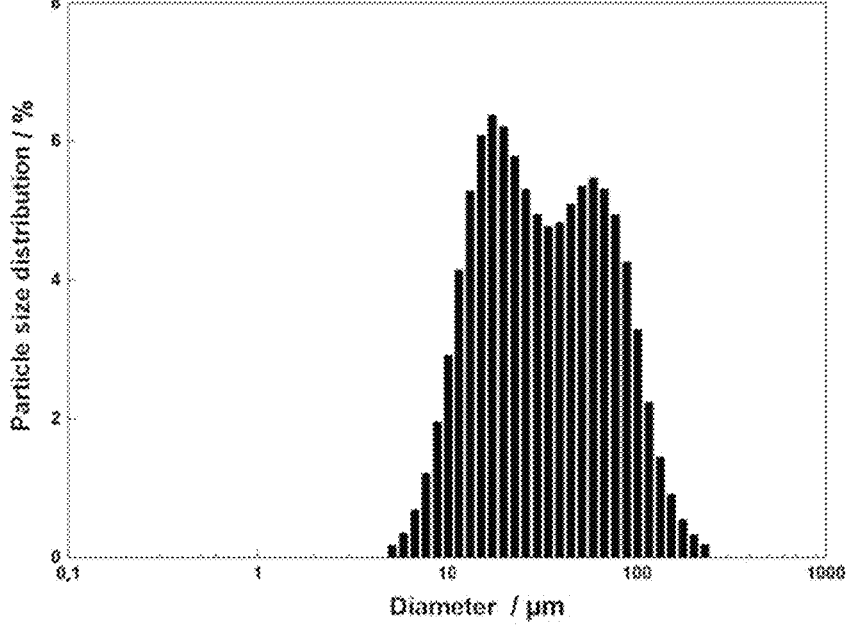
Figure 3A:
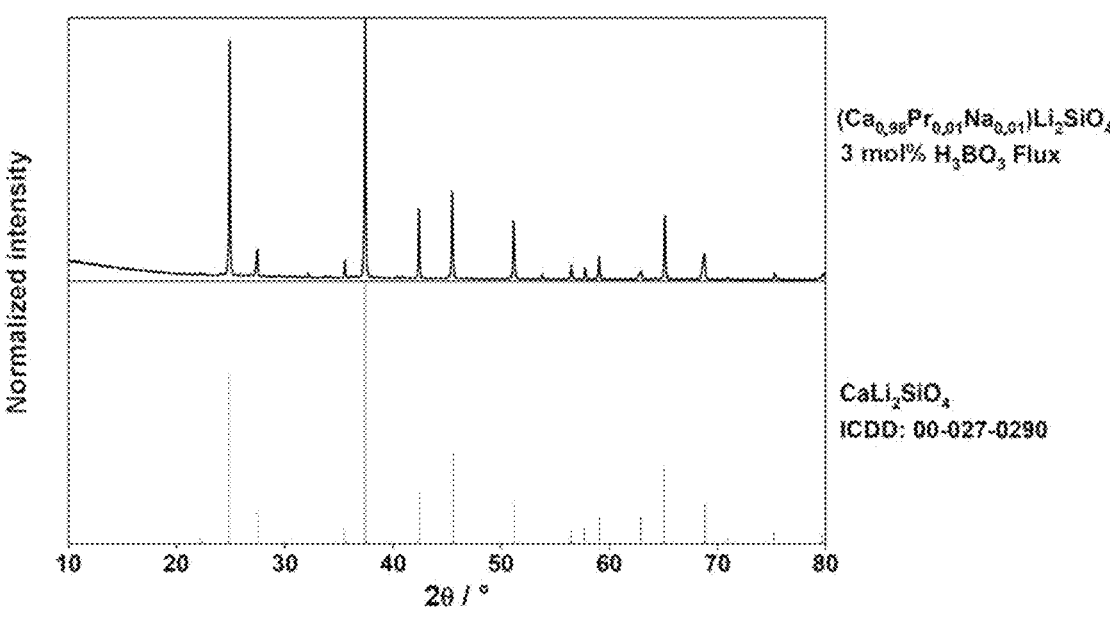
Figure 3B:
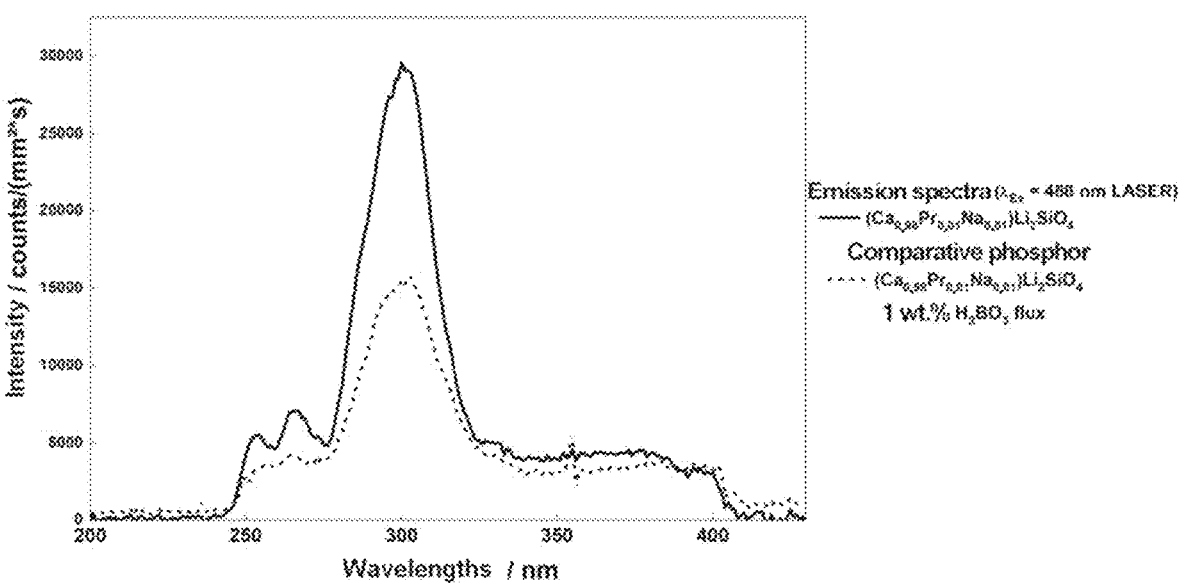
Figure 4A:
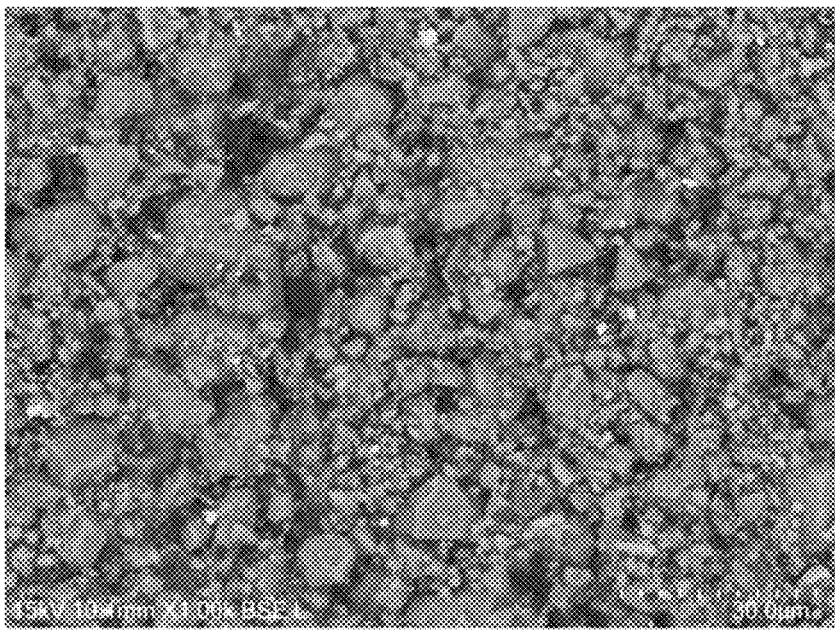
Figure 4B:
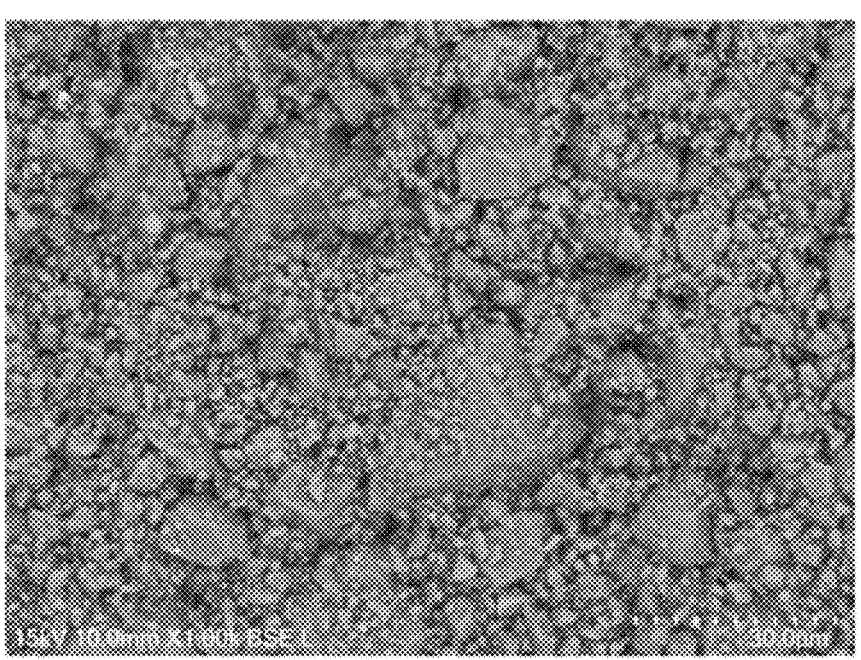

FIG. 2C shows a particle size distribution of Example 2
after a subsequent milling process.
FIG. 2D shows a particle size distribution of the com-
parative phosphor.
FIG. 3A shows an X-ray powder diffractogram (X-ray
diffraction pattern) of the phosphor from Example 3 (top)
compared to a non-fluxed reference phosphor (bottom nor-
malized X-ray diagram).
FIG. 3B shows an emission spectrum of Example 2
(dashed line) compared to a comparative phosphor which
has not been fluxed with $H_3BO_3$.
FIG. 4A shows a recorded image of the $CaLi_2SiO_4:Pr^{3+}$,
$Na^+(1\%)$ phosphor, without flux.
FIG. 4B shows a recorded image of the $CaLiSiO_4:Pr^{3+}$,
$Na^+(1\%)$ phosphor, with NaF as flux.

DETAILED DESCRIPTION OF THE
INVENTION

The person skilled in the art is aware of a great number of
fluxes of all kinds from the prior art, such as halides,
carbonates, sulfates, oxides and borates of, where respec-
tively applicable, ammonium, lithium, sodium, potassium,
rubidium, caesium, magnesium, calcium, strontium, barium,
lead, lanthanum, lutetium, aluminium, bismuth and boric
acid. Also known are their applications in the field of
metallurgy, for example for accelerating crystal growth or
suppressing the formation of extraneous phases.
Therefore, it was also an object of the invention to select
a suitable flux so that the desired properties could be
achieved. The discovery of suitable fluxes was therefore
particularly important, such that here too a contribution to
inventiveness already exists.
It was found, completely surprisingly, that the preparation
of the up-conversion phosphors in the presence of at least
one halogen-containing flux resulted in up-conversion phos-
phors having a homogeneous particle size distribution and
also increased intensity of the emission or greater quantum
yield, compared to phosphors without the addition of a flux
or comprising a different flux.
Treatment with fluxes is also called fluxing, that is to say
the product has been fluxed.
It has been shown in the examples that the particle size
distribution of the fluxed phosphor according to the inven-
tion resembles a Gaussian distribution, which points to the
homogeneity of the particle size, and so the incorporation
thereof in a coating matrix can advantageously be conducted
significantly more easily. It is assumed that the coating
properties, such as the appearance of the coating surface, for
example the gloss, feel and touch, were improved as a result
of this.
The intensity of the emission of the up-conversion phos-
phors could also be achieved through a simple technical
implementation.
A further subject of the invention is thus also a process for
the preparation of these up-conversion phosphors and also
the up-conversion phosphors obtainable thereby.
Preferably, the halogen-containing flux used is at least one
substance from the group of the ammonium halides, alkali
metal halides, alkaline earth metal halides and lanthanoid
halides. It has surprisingly been found with halides from
these groups that up-conversion phosphors prepared using
them have a higher emission intensity than with other fluxes.
The halides are preferably fluorides or chlorides.
The alkali metals are preferably potassium, sodium or
lithium.
The lanthanoid is preferably praseodymium.
The alkaline earth metals are preferably calcium or stron-
tium.

The phosphor has preferably been doped with praseodymium, which is used in the composition according to the invention.

For the composition according to the invention, the phosphor has preferably been doped with praseodymium and co-doped with gadolinium.

It is preferable that the phosphor is at least partially crystalline. It is thus preferable that the phosphor is partially or fully crystalline. The phosphor is thus preferably at least not entirely amorphous. It is therefore preferable that the phosphor is not an amorphously solidified melt (glass).

The phosphor is preferably a crystalline silicate or consists of crystalline silicates doped with lanthanoid ions, comprising at least one alkali metal ion and at least one alkaline earth metal ion.

For the composition according to the invention, the phosphor is preferably selected from compounds of the general formula (Ia)

$$A_{1-x-y-z}B^*_yB_2SiO_4:Pr_x,Gd_z, \tag{Ia}$$

with A being selected from the group consisting of Mg, Ca, Sr, Ba;

B being selected from the group consisting of Li, Na, K, Rb and Cs;

B* being selected from the group consisting of Li, Na and K, where B is the same as B* or B is not the same as B*, and preferably B and B* are not the same;

$x=0.0001$-$0.0500$;

$z=0.0000$ or $z=0.0001$ to $0.3000$ with the proviso that: $y=x+z$.

B* serves here to balance the charge of the praseodymium or gadolinium substitution.

A here may represent a single element from the group consisting of Mg, Ca, Sr and Ba, or else a combination of two or more elements from this group, i.e., for example $A=(Mg_{a1}\ Ca_{a2}\ Sr_{a3}Ba_{a4})$ with $0\leq a1\leq 1$, $0\leq a2\leq 1$, $0\leq a3\leq 1$, $0\leq a4\leq 1$, and with the proviso that: $a1+a2+a3+a4=1$. A may thus represent $(Ca_{0.9}Sr_{0.1})$, for example.

For the composition according to the invention, the phosphor is preferably selected from compounds of the general formula (II)

$$(Ca_{1-a}Sr_a)_{1-2b}Ln_bNa_bLi_2SiO_4 \tag{II}$$

where:

Ln is selected from the group consisting of praseodymium, gadolinium, erbium, neodymium, preferably praseodymium;

$a=0.0000$ to $1.0000$, preferably $0.0000$ to $0.1000$, especially $0.0000$;

$b=0.0001$ to $0.5000$, preferably $0.0001$ to $0.1000$, especially $0.0050$ to $0.0500$.

Ln here may represent a single element from the group consisting of praseodymium, gadolinium, erbium and neodymium, or else represent a combination of two elements from this group, i.e., for example, $Ln=(Ln^1_xLn^2_y)$ where $Ln^1$ and $Ln^2$ are selected from the group consisting of praseodymium, gadolinium, erbium and neodymium, and where x and y are as defined for formulae (I) and (Ia).

$Ln^1$ serves for doping. Preference is given to using praseodymium for the doping. $Ln^2$ serves for optional co-doping. Preference is given to using gadolinium for the optional co-doping. The phosphor has preferably not been co-doped; in other words, Ln preferably represents a single element from the group consisting of praseodymium, gadolinium, erbium and neodymium.

It is even more preferable for the phosphor to be selected from compounds of the general formula (IIa)

$$Ca_{1-2b}Pr_bNa_bLi_2SiO_4 \tag{IIa}$$

with $b=0.0001$ to $0.5000$, preferably $0.0001$ to $0.1$, especially $0.005$ to $0.0500$.

It is very particularly preferable for the phosphor to be $Ca_{0.98}Pr_{0.01}Na_{0.01}Li_2SiO_4$.

Preferably, the up-conversion phosphor according to the invention includes a halogen, corresponding to the halide of the flux.

The phosphor is preferably one which, on irradiation with electromagnetic radiation having lower energy and longer wavelength in the range from 2000 nm to 400 nm, especially in the range from 800 nm to 400 nm, emits electromagnetic radiation having higher energy and shorter wavelength in the range from 400 nm to 100 nm, preferably in the range from 300 nm to 200 nm. It is further preferable for the intensity of the emission maximum of the electromagnetic radiation having higher energy and shorter wavelength to be an intensity of at least $1 \cdot 10^3$ counts/(mm$^2$*s), preferably higher than $1 \cdot 10^4$ counts/(mm$^2$*s), particularly preferably higher than $1 \cdot 10^5$ counts/(mm$^2$*s). For determination of these indices, emission is preferably induced by means of a laser, especially a laser having a power of 75 mW at 445 nm and/or a power of 150 mW at 488 nm.

The phosphor according to formula (II) preferably has XRPD signals in the range from 23° 2θ to 27° 2θ and from 34° 2θ to 39.5° 2θ, the signals being determined by means of the Bragg-Brentano geometry and Cu-K$_\alpha$ radiation. Details of the method of measurement can be found in the as-yet unpublished European patent applications EP 19202910.6 and PCT/EP2020/077798.

The as-yet unpublished European patent applications EP 19202910.6 and PCT/EP2020/077798 are dedicated to the preparation of phosphors, especially of phosphors of formula (I), formula (Ia) and formula (II), without the addition of fluxes.

Proceeding from the process described in these documents, the process according to the invention comprises the following steps:

i) providing at least one lanthanoid salt selected from lanthanoid nitrates, lanthanoid carbonates, lanthanoid carboxylates, preferably lanthanoid acetates, lanthanoid sulfates, lanthanoid oxides, particularly preferably $Pr_6O_{11}$ and/or $Gd_2O_3$, where the lanthanoid ion in the lanthanoid oxides or lanthanoid salts is selected from praseodymium, gadolinium, erbium, neodymium and, for co-doping, at least two of these, ii) providing a silicate, preferably a silicate salt, particularly preferably an alkali metal salt of the silicate, or a silicon dioxide, iii) providing at least one alkaline earth metal salt and at least one alkali metal salt, preferably an alkali metal silicate or an alkali metal carbonate selected from a lithium salt or a lithium compound and optionally selected from a sodium salt and potassium salt, preferably the salt of the lithium salt, preferably a lithium carbonate, a calcium carbonate and a sodium carbonate, iv) providing at least one flux from the group of the ammonium halides, preferably ammonium chloride, alkali metal halides, preferably sodium chloride, sodium fluoride, sodium bromide, lithium fluoride or lithium chloride, alkaline earth metal halides, preferably calcium chloride or calcium fluoride, and lanthanoid halides, preferably praseodymium fluoride or praseodymium chloride, a) mixing i), ii), iii) and iv) by means of grinding to obtain a mixture, or b) mixing i), ii) and iii) in an organic polar or nonpolar solvent that is not a protic solvent to obtain a mixture; the mixture from b) is calcined (step 1a) at 600 to 1000° C. to remove the organic component: preference is given to performing the calcination at 600 to 1000° C. for at least 1 h, preferably not less than 2 h, under standard (air) atmosphere to obtain a calcined mixture, calcining the mixture from a) or the calcined mixture from b) in a calcination step, preferably under air at a temperature below the melting temperature of the silicate-based material, wherein at least partial crystallization takes place, preferably in a further calcination step (step 1b) at a temperature of 50 to 200° C. below the melting temperature of the silicate-based material for at least 3 h, preferably under air, in order to crystallize the silicate-based material, preferably at a temperature of 800 to 900° C., particularly preferably at about 850° C., for at least 3 h, preferably for at least 12 h, preferably under air.

in a further calcination step with rising temperature, preferably above 800° C. and 50 to 200° C. below the melting point (step 2) of the material, for example at 850° C. for at least 3 h, particularly preferably for at least 6 h, under a reducing atmosphere, reducing the lanthanoids to $Ln^{3+}$ ions, obtaining a silicate-based lanthanoid ion-doped material, preferably after cooling the material.

Further detailed embodiments of the process can be gathered from EP 19202910.6 and PCT/EP2020/077798, a flux being used for the process according to the invention.

Completely surprisingly, it was possible to modify the known process in an elegant manner, additionally leading to optimized up-conversion phosphors with exceptional and unexpected properties with respect to the particle size distribution and increase in the emission intensity.

Preferably, 0.01% by weight-3.5% by weight, preferably 0.5%-3.5% by weight, particularly preferably 1.0%-3.5% by weight, of flux can be used, based on the total amount of the reactants.

It has been found that, surprisingly, the phosphors according to the invention, prepared in accordance with the teaching of EP 19202910.6 and PCT/EP2020/077798, have the required up-conversion properties responsible for the antimicrobial action. In other words, these phosphors can convert electromagnetic radiation having wavelengths above UV radiation, especially visible light or infrared light, to electromagnetic radiation having shorter wavelength, specifically in the region in which, for example, the DNA or RNA of the microorganisms can be destroyed or mutated. Accordingly, these phosphors are of very good suitability for the composition according to the invention.

It is also conceivable to prepare the phosphor according to the invention as follows: Starting materials used are $CaCO_3$ (Alfa Aesar, 99.5%), $Li_2CO_3$ (Alfa Aesar, 99%), $SiO_2$ (Aerosil 200, Evonik), $Pr_6O_{11}$ (Treibacher, 99.99%), and $Na_2CO_3$ (Merck, 99.9%) and also a $CaF_2$ (Sigma-Aldrich, 99.9%) flux. A stoichiometric mixture of these compounds is mixed in acetone for 30 minutes. Once the acetone has evaporated fully at room temperature, the mixture is transferred to a corundum crucible. The mixture is calcined twice. The first calcination is conducted in a melting furnace at 850° C. for 12 h with supply of air, and the second calcination at 850° C. for 6 h under 95/5 $N_2/H_2$. The end product is then ground in an agate mortar.

It should be mentioned here that it is possible to use a subsequent milling of the phosphor in accordance with the teaching of EP 19202910.6 and PCT/EP2020/077798 to firstly achieve homogeneity of the particle size and secondly to achieve the desired particle size. However, in this case the energy input would be higher and the milling process would last longer due to the inhomogeneity and particle size distribution thereof after the preparation.

A further problem addressed by the invention is the selection of film-forming polymers that can be used for the curable composition having an antimicrobial property. In principle, all film-forming polymers known from the prior art are useful.

The film-forming polymer preferably has functional groups, preferably acidic hydrogens, that are reactive with an isocyanate-containing curing agent, and is optionally catalysed by a catalyst.

Advantageously, the film-forming polymer is selected from the group of the hydroxy-functional acrylate polymers, hydroxy-functional polyester polymers, and/or hydroxy-functional polyether polymers, hydroxy-functional cellulose derivatives, amino-functional aspartic polymers or polyester polymers, which reacts with an isocyanate-containing curing agent.

The film-forming polymer preferably has low resonance.

The person skilled in the art is aware of the physical interactions at the surface. Depending on the material and its material surface, a plurality of effects occur at the surface on incidence of light. The incident light is partly absorbed, partly reflected and, depending on the material surface, also scattered. Light can also first be absorbed and then emitted again. In the case of opaque, semitransparent or transparent materials, the light can also penetrate through the body (transmission). In some cases, the light is even polarized or diffracted at the surface. Some objects can even emit light (illuminated displays, LED segments, display screens), or fluoresce or phosphoresce in light of a different colour (afterglow).

What is meant by "low resonance" in the context of the present invention is that the film-forming polymer has low absorption, reflection, remission and scatter in the UV region or in the blue region at 450-500 nm. By contrast, transmittance should preferably be pronounced.

This is because it has been found that, surprisingly, the film-forming polymers according to the invention that have low resonance have improved antimicrobial action, because more electromagnetic radiation having lower energy and higher wavelength in the range from 2000 nm to 400 nm, especially in the range from 800 nm to 400 nm, is transmitted and, as a result, more electromagnetic radiation having higher energy and shorter wavelength in the range from 400 nm to 100 nm, preferably in the range from 300 nm to 200 nm, can be emitted.

It has been found that the higher the transmittance, the higher the emission as well, which is crucial for antimicrobial action.

Preferably, the transmittance of the film-forming polymer is at least 75%, preferably at least 80% and particularly preferably at least 85%, measured at a wavelength of 260 nm.

Preferably, the transmittance of the film-forming polymer is at least 75%, preferably at least 80% and particularly preferably at least 85%, measured at a wavelength of 500 nm.

Figure 1A:
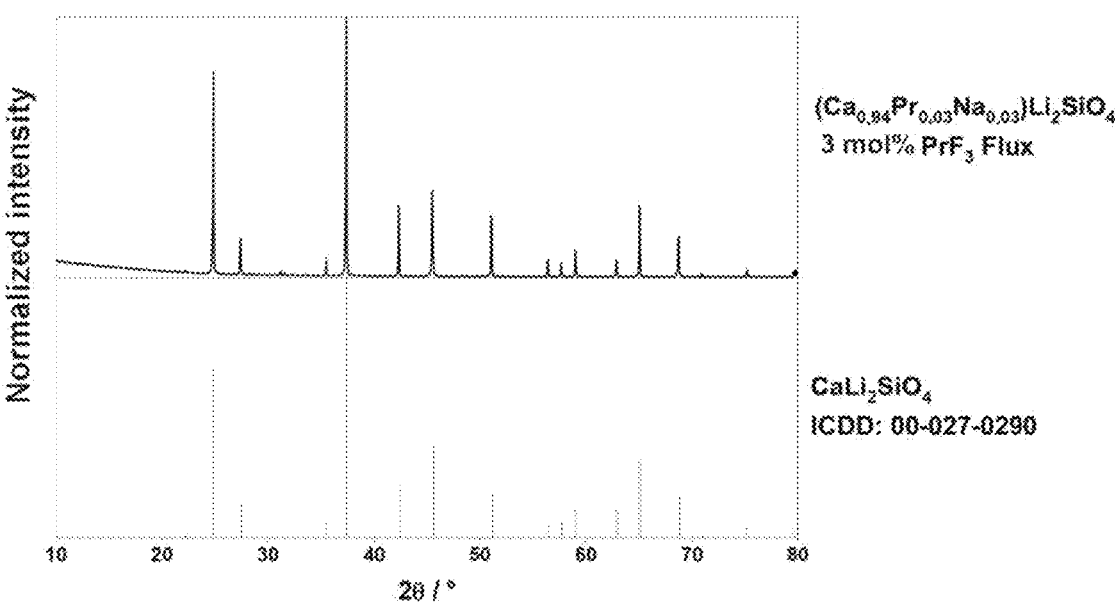
FIG. 1A shows an X-ray powder diffractogram (X-ray
diffraction pattern) of the phosphor from Example 1 (top)
compared to a non-fluxed reference phosphor (bottom nor-
malized X-ray powder diffractogram).
Figure 1B:
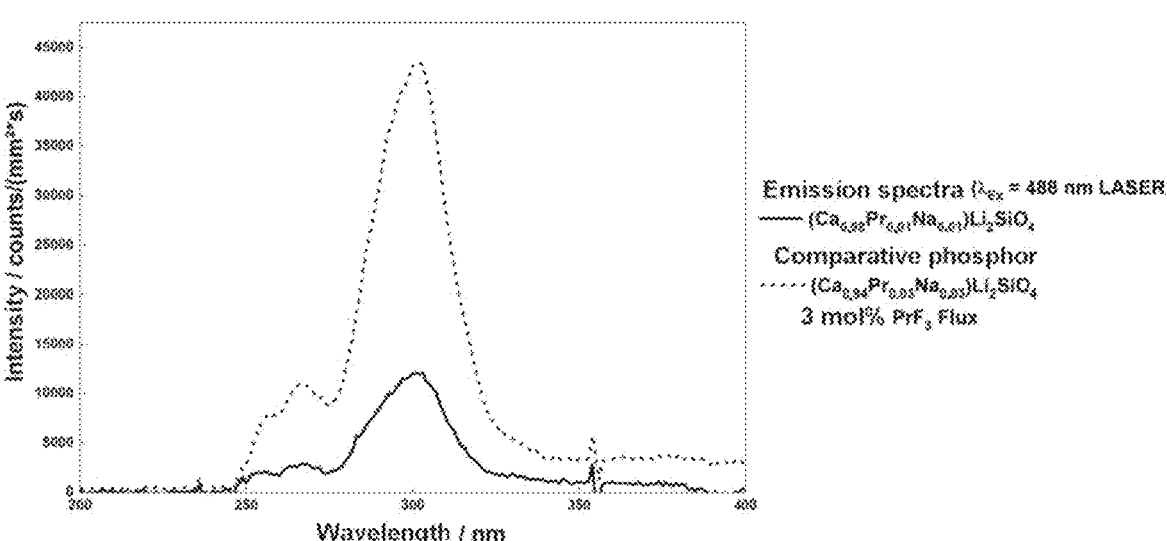
FIG. 1B shows an emission spectrum of Example 1
(dashed line) compared to a comparative phosphor which
has not been fluxed with $PrF_3$.
Figure 1C:
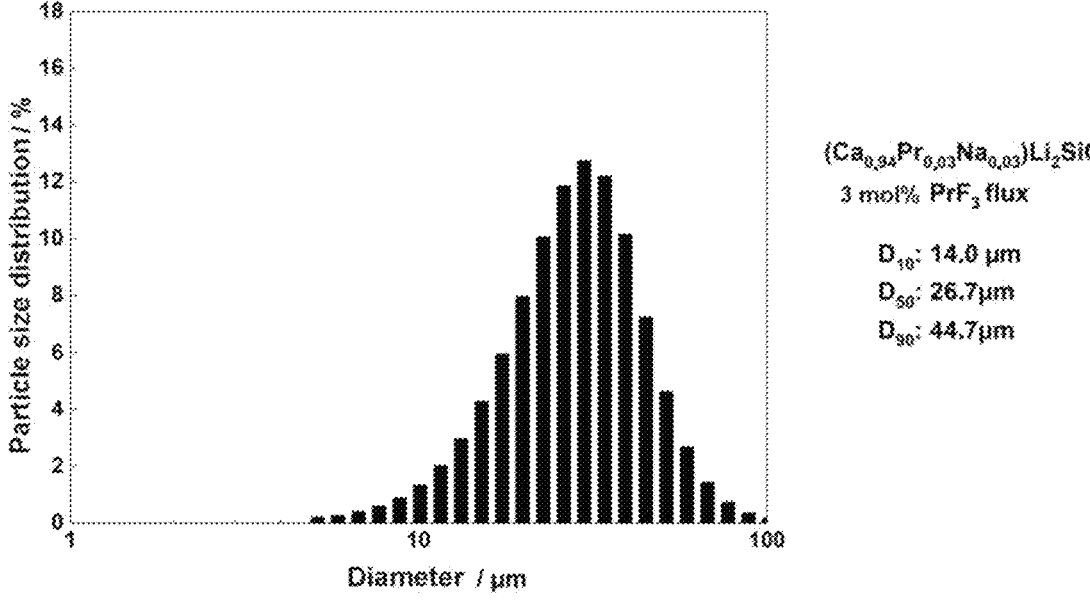
FIG. 1C shows a particle size distribution of Example 1.

By way of illustration, it should be noted here that transmittance may be defined at a different wavelength; see FIGS. 1A-1C. For the present invention, the wavelengths of 260 nm by way of example for the wavelength emitted and 500 nm by way of example for the excitation wavelength were chosen, which are responsible on the one hand for the up-conversion and on the other hand to a significant degree for the antimicrobial action.

In the case of 100% transmittance, for example, measured at a wavelength of 260 nm, the same amount of radiation is converted and emitted; in other words, there are no losses through absorption, scatter or the like. In the case of 80% transmittance, measured at a wavelength of 260 nm, 20% is not transmitted, probably owing to absorption, reflection, remission and/or scatter. Accordingly, only 80% of the radiation of wavelength 260 nm can be emitted.

This significant finding is important in the selection of the film-forming polymers. Polymers having 0% transmittance, for example, are unsuitable for the curable composition according to the invention. They do not transmit any electromagnetic radiation having lower energy and higher wavelength and, accordingly, phosphors present in the composition cannot convert this electromagnetic radiation to electromagnetic radiation having higher energy and shorter wavelength and emit it, which is required for the antimicrobial action.

Preferably, the composition according to the invention has a transmittance of at least 75%, preferably at least 80% and particularly preferably at least 85%, measured at 260 nm.

Preferably, the composition according to the invention has a transmittance of at least 75%, preferably at least 80% and particularly preferably at least 85%, measured at 500 nm.

The transmittance curves are preferably measured with a "Specord 200 Plus" twin-beam UV/VIS spectrometer from Analytik Jena. A holmium oxide filter is used for internal wavelength calibration. Monochromatic light from a deuterium lamp (UV range) or a tungsten-halogen lamp (visible range) is passed through the samples. The spectral range is 1.4 nm. The monochromatic light is divided into a measurement channel and a reference channel and enables direct measuring against a reference sample. The radiation transmitted through the sample is detected by a photodiode and processed to form electrical signals.

It is conceivable to use a composition having a low transmittance of less than 70%; they possibly also still have antimicrobial action, but the efficiency is very moderate.

The phosphors preferably have an average particle size of d50 of 0.1-50 μm, preferably d50=0.1-25 μm, particularly preferably d50=0.1 μm-5 μm, measured to ISO 13320:2020 and USP 429, for example with an LA-950 Laser Particle Size Analyzer from Horiba.

In order to efficiently incorporate and/or stabilize the phosphors in the composition according to the invention, it is preferably possible to add various additives.

The additives are preferably selected from the group of the dispersants, rheology aids, levelling agents, wetting agents, defoamers and UV stabilizers.

It has been found that, surprisingly, any addition of additives to the composition according to the invention reduces transmittance.

Accordingly, the composition according to the invention, in a further embodiment in which additives are used, preferably has a transmittance of at least 70%, preferably at least 75% and particularly preferably at least 80%, measured at 260 nm.

Accordingly, the composition according to the invention, in a further embodiment in which additives are used, preferably has a transmittance of at least 70%, preferably at least 75% and particularly preferably at least 80%, measured at 500 nm.

Preferably, the composition according to the invention includes a curing agent selected from the group of the aliphatic or cycloaliphatic isocyanates.

Examples of isocyanate-containing curing agents are monomeric isocyanates, polymeric isocyanates and isocyanate prepolymers. Polyisocyanates are preferred over monomeric isocyanates on account of their lower toxicity. Examples of polyisocyanates are isocyanurates, uretdiones and biurets based on diphenylmethane diisocyanate (MDI), toluene diisocyanate (TDI), hexamethylene diisocyanates (HDI) and isophorone diisocyanate (IPDI). Examples of commercially available products are those under the trade name DESMODUR® from Covestro or VESTANAT from Evonik Industries. Known products are DESMODUR® N3400, DESMODUR® N3300, DESMODUR® N3600 DESMODUR® N75, DESMODUR® XP2580, DESMODUR® Z4470, DESMODUR® XP2565 and DESMODUR® VL from Covestro. Further examples are VESTANAT® HAT 2500 LV, VESTANAT® HB 2640 LV or VESTANAT® T 1890E from Evonik Industries. Examples of isocyanate prepolymers are DESMODUR® E XP 2863, DESMODUR® XP 2599 or DESMODUR® XP 2406 from Covestro. Further isocyanate prepolymers known to the person skilled in the art may be used.

It is conceivable to use catalysts for the curing. The catalysts that follow, selected from organic Sn(IV), Sn(II), Zn, Bi compounds or tertiary amines, may be used.

Preference is given to using catalysts selected from the group of organotin catalysts, titanates or zirconates, organometallic compounds of aluminium, iron, calcium, magnesium, zinc or bismuth, Lewis acids or organic acids/bases, linear or cyclic amidines, guanidines or amines or a mixture thereof.

Curing catalysts used are preferably organic tin compounds, for example, dibutyltin dilaurate, dibutyltin diacetylacetonate, dibutyltin diacetate, dibutyltin dioctoate, or dioctyltin dilaurate, dioctyltin diacetylacetonate, dioctyltin diketanoate, dioctylstannoxane, dioctyltin dicarboxylate, dioctyltin oxide, preferably dioctyltin diacetylacetonate, dioctyltin dilaurate, dioctyltin diketanoate, dioctylstannoxane, dioctyltin dicarboxylate, dioctyltin oxide, particularly preferably dioctyltin diacetylacetonate and dioctyltin dilaurate. In addition, it is also possible to use zinc salts, such as zinc octoate, zinc acetylacetonate and zinc 2-ethylcaproate, or tetraalkylammonium compounds, such as N,N, N-trimethyl-N-2-hydroxypropylammonium hydroxide, N,N,N-trimethyl-N-2-hydroxypropylammonium 2-ethylhexanoate or choline 2-ethylhexanoate. Preference is given to the use of zinc octoate (zinc 2-ethylhexanoate) and of the tetraalkylammonium compounds, particular preference to that of zinc octoate. Further preferred are bismuth catalysts. e.g. TIB Kat (TIB Mannheim) or Borchi® catalysts, titanates, e.g. titanium(IV) isopropoxide, iron(III) compounds, e.g. iron(III) acetylacetonate, aluminium compounds, such as aluminium triisopropoxide, aluminium tri-sec-butoxide and other alkoxides and also aluminium acetylacetonate, calcium compounds, such as calcium disodium ethylenediaminetetraacetate or calcium diacetylacetonate, or else amines, examples being triethylamine, tributylamine, 1,4-diazabicyclo[2.2.2]octane, 1,8-diazabicyclo[5.4.0]undec-7-ene, 1,5 diazabicyclo[4.3.0]non-5-ene, N,N-bis(N,N-dimethyl-2-aminoethyl)methylamine, N,N-dimethylcyclohexylamine, N,N-dimethylphenylamine, N-ethylmorpholine, etc. Also preferred as catalysts are organic or inorganic Brønsted acids such as acetic acid, trifluoroacetic acid, methanesulfonic acid, p-toluenesulfonic acid or benzoyl chloride, hydrochloric acid, phosphoric acid and the monoesters and/or diesters thereof, for example butyl phosphate, (iso)propyl phosphate, dibutyl phosphate, etc. Also preferred are guanidine-bearing organic and organosilicon compounds. It is of course also possible to use combinations of two or more catalysts. In addition, it is also possible to use photolatent bases as catalysts, as described in WO 2005/100482.

The curing catalyst is preferably used in amounts of 0.01% to 5.0% by weight, preferably 0.05% to 4.0% by weight and particularly preferably 0.1% to 3% by weight, based on the total weight of the curable composition.

In the case of film-forming polymers that cure through physical drying, the addition of reactive curing agents is not required.

The composition according to the invention may preferably be used in 1K (one-component) coating systems or 2K (two-component) coating systems, in melamine baking systems, or room- or high-temperature systems.

Preferably, coatings produced from the composition according to the invention have antimicrobial action against bacteria, yeasts, moulds, algae, parasites and viruses.

The coatings produced according to the invention preferably have antimicrobial action against pathogens of nosocomial infections, preferably against *Enterococcus faecium, Staphylococcus aureus, Klebsiella pneumoniae, Acinetobacter baumannii, Pseudomonas aeruginosa, Escherichia coli, Enterobacter, Corynebacterium diphtheriae, Candida albicans,* rotavirus, bacteriophages;

facultatively pathogenic environmental organisms, preferably against *Cryptosporidium parvum, Giardia lamblia,* amoebas (*Acanthamoeba* spp., *Naegleria* spp.), *E. coli,* coliform bacteria, faecal streptococci, *Salmonella* spp., *Shigella* spp., *Legionella* spec., *Pseudomonas aeruginosa, Mycobacterium* spp., enteral viruses (e.g. polio and hepatitis A virus);

pathogens in food and drink, preferably against *Bacillus cereus, Campylobacter* spp., *Clostridium botulinum, Clostridium perfringens, Cronobacter* spp., *E. coli, Listeria monocytogenes, Salmonella* spp., *Staphylococcus aureus, Vibrio* spp., *Yersinia enterocolitica,* bacteriophages.

It has been found that the incorporation of the up-conversion phosphors according to the invention was markedly improved.

Up-conversion phosphors and phosphors are used as synonyms.

The invention further provides for the use of the composition according to the invention for the production of dispersions, millbases, adhesives, trowelling compounds, renders, paints, coatings or printing inks, inkjets, grinding resins or pigment concentrates.

Preference is given to the use of the composition according to the invention for the production of coatings having an antimicrobial property.

What is meant here by a coating having antimicrobial action or an antimicrobial property is that the coating has an antimicrobial surface that limits or prevents the growth and propagation of microorganisms.

It has also been found that, astonishingly, the coatings according to the invention have chemical and mechanical stability. Chemical and mechanical stability is particularly important since antimicrobial coatings are frequently used in areas that require regular disinfection and further hygiene measures.

The invention also includes a process for forming an antimicrobial coating on a substrate, comprising the application of a curable film-forming composition to the substrate, comprising:

a. at least one film-forming polymer containing functional groups which are reactive with an isocyanate-containing curing agent, optionally catalysed by a catalyst, b. at least one phosphor of the formula (II) and c. a curing agent containing isocyanate-functional groups.

Preferably, the substrate is metal, mineral substrates (for instance concrete, natural rock or glass), cellulosic substrates, wood and hybrids thereof, dimensionally stable plastics and/or thermosets.

The term "dimensionally stable plastics" is understood to mean, albeit non-exhaustively, the following polymers: acrylonitrile-butadiene-styrene (ABS), polyamides (PA), polylactate (PLA), polymethyl methacrylate (PMMA), polycarbonate (PC), polyethylene terephthalate (PET), polystyrene (PS), polyether ether ketone (PEEK), polyvinyl chloride (PVC), polypropylene (PP), polyethylene (PE).

Preferably, a primer composition may be applied to the substrate prior to the application of the curable film-forming composition.

Preferably, the curable composition according to the invention is used for the coating of substrates in hygiene facilities and hospitals and in the food and drink industry.

This includes all settings in the public sphere, for example schools, old people's homes, industrial kitchens or nurseries.

A further invention is an article that has been coated at least partly, preferably fully, with the curable composition according to the invention.

It should be noted here that the terms "antimicrobial effect", "antimicrobial efficacy", "antimicrobial action" and "antimicrobial property" are used as synonyms.

It should be noted here that the article according to the invention may preferably have antimicrobial action even without release of an antimicrobial active ingredient if the coating comprises specific phosphors as described. In this way, the route via which the microorganisms are then killed is physical. Therefore, such materials are not covered by the biocide regulation (Regulation (EU) No 528/2012 of the European Parliament and of the Council of 22 May 2012 in the current text of 2019).

Adduced hereinafter are examples that serve solely to elucidate this invention to the person skilled in the art and do not constitute any restriction at all of the subject-matter as described.

Methods

Particle size distribution to ISO 13320:2020 and USP 429, with a Horiba LA-950 Laser Particle Size Analyzer Qualitative elemental analysis by means of EDX with a Tabletop 4000Plus from Hitachi, kV BSE detector, 1000× magnification Powder XRD: The X-ray powder diffractograms of the samples were recorded using a Panalytical X'Pert PRO MPD diffractometer operating in Bragg-Brentano geometry, using Cu-$K_\alpha$ radiation and a line scan CCD detector. The integration time was 20 s and the step width was 0.017° 2θ.

The emission spectra were recorded with the aid of an Edinburgh Instruments FLS920 spectrometer equipped with a 488 nm continuous-wave OBIS laser from Coherent and a Peltier-cooled (−20° C.) single-photon counting photomultiplier from Hamamatsu (R2658P). Bandpass filters were used to suppress nth-order reflections caused by the monochromators.

I. Phosphors

Example 1 Phosphor According to the Invention $(Ca_{0.94}Pr_{0.03}Na_{0.03})Li_2SiO_4$ with 3 mol % of $PrF_3$ as Flux 2.8225 g (28.2 mmol) of $CaCO_3$, 2.2167 g (30.0 mmol) of $Li_2CO_3$, 1.8025 g (30.0 mmol) of $SiO_2$, 0.0477 g (0.45 mmol) of $Na_2CO_3$ and 0.1781 g (0.9 mmol) of $PrF_3$ were mixed in acetone in an agate mortar. This mixture was calcined at 850° C. for 12 h in air to remove organic constituents. The calcination is then conducted at 850° C. for a further 6 h in a forming gas atmosphere (5% $H_2$/95% $N_2$), which results in the desired product. The phosphor was withdrawn for further measurements.

FIG. 1A shows an X-ray powder diffractogram (X-ray diffraction pattern) of the phosphor from Example 1 (top diagram) compared to a non-fluxed reference phosphor (bottom normalized X-ray powder diffractogram). It was shown that the desired phosphor was prepared.

FIG. 1B shows an emission spectrum of Example 1 (dashed line) compared to a comparative phosphor which has not been fluxed with $PrF_3$. The comparative phosphor (black line) was prepared analogously to Example 1, but without $PrF_3$. The spectrum clearly shows that the intensity can be increased in the desired wavelength range by the addition of the flux.

FIG. 1C shows a particle size distribution of Example 1. The $D_{10}$, $D_{50}$ and $D_{90}$ were measured. The following values were determined:

$D_{10}$: 14.0 μm
$D_{50}$: 26.7 μm
$D_{90}$: 44.7 μm

Example 2 Phosphor According to the Invention $(Ca_{0.98}Pr_{0.01}Na_{0.01})Li_2SiO_4$ with 2.5% by Weight of $CaF_2$ as Flux 2.9426 g (29.4 mmol) of $CaCO_3$, 2.2167 g (30.0 mmol) of $Li_2CO_3$, 1.8025 g (30.0 mmol) of $SiO_2$, 0.0511 g (0.05 mmol) of $Pr_6O_{11}$, 0.0159 g (0.15 mmol) of $Na_2CO_3$ and 0.1102 g (2.2029 mmol) of $CaF_2$ were mixed in acetone in an agate mortar. This mixture was calcined at 850° C. for 12 h in air to remove organic constituents. The calcination is then conducted at 850° C. for a further 6 h in a forming gas atmosphere (5% $H_2$/95% $N_2$), which results in the desired product.

FIG. 2A shows an X-ray powder diffractogram (X-ray diffraction pattern) of the phosphor from Example 2 (top diagram) compared to a non-fluxed reference phosphor (bottom normalized X-ray diagram). It was shown that the desired phosphor was prepared.

FIG. 2B shows an emission spectrum of Example 2 (dashed line) compared to a comparative phosphor which has not been fluxed with $CaF_2$. The comparative phosphor (black line) was prepared analogously to Example 1, but without $CaF_2$. The spectrum clearly shows that the intensity can be increased in the desired wavelength range by the addition of the flux.

FIG. 2C shows a particle size distribution of Example 2 after a subsequent milling process. The particle size was thus comminuted. The $D_{10}$, $D_{50}$ and $D_{90}$ were measured. The following values were determined:

$D_{10}$: 7.7 μm
$D_{50}$: 12.9 μm
$D_{90}$: 20.7 μm

FIG. 2D shows a particle size distribution of the comparative phosphor. The $D_{10}$, $D_{50}$ and $D_{90}$ were measured. The following values were determined:

$D_{10}$: 11.1 μm
$D_{50}$: 28.9 μm
$D_{90}$: 85.4 μm

It was found that the particle size of the phosphor according to the invention (FIG. 1C) as a result of the flux is more homogeneous than the particle size of the comparative phosphor (FIG. 2D). The phosphor according to the invention can thus be incorporated into the coating matrix more easily, which may possibly lead to improved coating properties, such as the appearance of the coating surface, for example the gloss, the feel and the touch.

Example 3 Comparative Example Using a Different Flux, $(Ca_{0.98}Pr_{0.01}Na_{0.01})Li_2SiO_4$ with 1% by Weight of $H_3BO_3$ 2.9426 g (29.4 mmol) of $CaCO_3$, 2.2167 g (30.0 mmol) of $Li_2CO_3$, 1.8025 g (30.0 mmol) of $SiO_2$, 0.0511 g (0.05 mmol) of $Pr_6O_{11}$, 0.0159 g (0.1500 mmol) of $Na_2CO_3$ and 0.0441 g (0.7132 mmol) of $H_3BO_3$ were mixed in acetone in an agate bowl. This mixture was calcined at 850° C. for 12 h in air to remove organic constituents. The calcination is then conducted at 850° C. for a further 6 h in a forming gas atmosphere (5% $H_2$/95% $N_2$), which results in the desired product. The phosphor was withdrawn for further measurements.

FIG. 3A shows an X-ray powder diffractogram (X-ray diffraction pattern) of the phosphor from Example 3 (top diagram) compared to a non-fluxed reference phosphor (bottom normalized X-ray diagram). It was shown that the desired phosphor was prepared.

FIG. 3B shows an emission spectrum of Example 2 (dashed line) compared to a comparative phosphor which has not been fluxed with $H_3BO_3$. The comparative phosphor (black line) was prepared analogously to Example 1, but without $H_3BO_3$. The spectrum clearly shows that the intensity of the phosphor according to Example 3 was reduced in the desired wavelength range by addition of the $H_3BOs$. This flux appears not to be suitable.

Further measurements were therefore not performed.

Example 4 Visual Comparison Using Recorded Images of Fluxed and Unfluxed Phosphors Two $CaLi_2SiO_4$:$Pr^{3+}$,$Na^+$(1%) phosphors were prepared in analogous fashion, NaF being added as flux to one of the phosphors.

2.9426 g (29.4 mmol) of $CaCO_3$, 2.2167 g (30.0 mmol) of $Li_2CO_3$, 1.8025 g (30.0 mmol) of $SiO_2$, 0.0511 g (0.05 mmol) of $Pr_6O_{11}$, 0.0159 g (0.15 mmol) of $Na_2CO_3$ and 0.1855 g (3.0 mmol) of NaF were mixed in acetone in an agate mortar. This mixture was calcined at 850° C. for 12 h in air to remove organic constituents. The calcination is then conducted at 850° C. for a further 6 h in a forming gas atmosphere (5% $H_2$/95% $N_2$), which results in the desired product.

FIG. 4A shows a recorded image of the $CaLi_2SiO_4$:$Pr^{3+}$, $Na^+$(1%) phosphor, without flux. The recording was taken using a BSE detector at 15 kV with 1000× magnification.

FIG. 4B shows a recorded image of the $CaLi_2SiO_4$:$Pr^{3+}$, $Na^+$(1%) phosphor, with NaF as flux. The recording was taken using a BSE detector at 15 kV with 1000× magnification.

It is evident that the sample with addition of flux results in a more homogeneous particle image.

II. Application Examples

The procedure was analogous to the examples from EP 21157055.1. Methods, devices and materials were identical to those from EP 21157055.1. Only the phosphor according to the invention (fluxed) was substituted.

The numbering of EP 21157055.1 is listed formally here in order to avoid a copy of the cited passages and tables.

1. Selection of the film-forming polymers
1.1 Preparation of the composition without phosphors and additives
1.2 Coating of the polymer matrices onto quartz plates
1.3 Measurement of transmittance
2. Selection of additives
2.1 Measurement of transmittance
2.2 Testing of the coating properties of the polymer matrices without phosphors
3. Testing of antimicrobial efficacy
3.1 Selection of phosphors
$CaLi_2SiO_4$:$Pr^{3+}$,$Na^+$(1%) fluxed with 10 mol % NaF, according to Example 4
$CaLi_2SiO_4$:$Pr^{3+}$,$Na^+$(1%) fluxed with 2.5% by weight $CaF_2$, according to Example 2
3.2 Testing of the Antimicrobial Efficacy of a Composition According to the Invention It should be noted here that the terms "antimicrobial effect", "antimicrobial efficacy", "antimicrobial action" and "antimicrobial property" are used as synonyms.

To test the antimicrobial efficacy, the fluxed phosphors from II. 3.1 were each formulated into a curable composition C. They were prepared according to the data from Table 1. 50 g of glass beads were added to the respective composition and the mixture was ground in a Speedmixer at 2000 rpm for 5 min. After filtering off the glass beads, the respective composition was coated onto a high-gloss rolled aluminium panel and crosslinked to form a film having a dry film thickness of approximately 50 μm. On the substrate there is now a coating, the coating surface of which should have an antimicrobial action, and the reference thereof without expected antimicrobial action. Comparative example CE does not contain any phosphors.

TABLE 1

Formulations of the curable compositions for the transfer method

|  | CE [g] | C2-1 [g] | C2-2 [g] | C4-1 [g] | C4-2 [g] |
|---|---|---|---|---|---|
| CAB ™ 381-2 | 6.82 | 6.82 | 6.82 | 6.82 | 6.82 |
| Butyl acetate | 38.64 | 38.64 | 38.64 | 38.64 | 38.64 |
| $CaLi_2SiO_4$:$Pr^{3+}$, $Na^+$(1%) $CaF_2$ |  | 0.90 | 1.33 |  |  |
| $CaLi_2SiO_4$:$Pr^{3+}$, $Na^+$(1%) NaF |  |  |  | 0.90 | 1.33 |
| TIB Kat ® 218 | 0.05 | 0.05 | 0.05 | 0.05 | 0.05 |
| Desmodur ® N 3390 | 4.55 | 4.55 | 4.55 | 4.55 | 4.55 |

3.2.1 Transfer Method

Testing was effected on *Bacillus subtilis*, which is used for biodosimetric testing of UV systems in DVGW (German Technical and Scientific Association for Gas and Water) Arbeitsblatt W 294 "UV-Geräte zur Desinfektion in der Wasserversorgung" [Standard W 294 "UV Instruments for Disinfection in Water Supply"]. Being a Gram-positive spore-forming bacterium, it is particularly insensitive to UV radiation and hence of good suitability as a worst case for testing of the antimicrobial action of UV radiation.

The test organism used was *Bacillus subtilis* subsp. *spizizenii* (DSM 347, ATCC 6633). 1 ml of a *B. subtilis* suspension with a final concentration of $10^7$ cells/ml was distributed homogeneously over a sterile CASO agar plate in order to assure confluent coverage of the nutrient agar. The bacteria suspension applied was equilibrated on the nutrient agar at room temperature (22±2° C.) for 300±30 s. The bacteria suspensions were produced by dilutions of pre-cultures of the respective bacterial strain. Dilution was effected in sterile deionized water. The pre-cultures of the test organisms were produced in sterilized CASO broth. The pre-culture of *B. subtilis* was incubated at 30° C. with constant agitation in an agitated water bath for 16±1 h. The cell titre of the pre-cultures was determined by microscopy with a haemocytometer (Thoma counting chamber).

The aim of the transfer method is to simulate the antimicrobial action of the coating surface under close-to-real conditions on a dry inanimate surface. For this purpose, the coatings obtained as described above were cut to a size of 2.5 cm×4 cm and pressed onto a nutrient agar plate confluently inoculated with *B. subtilis* with a defined weight of 90±1 g for 60±5 s. This step transferred the bacteria in semi-dry form to the surface of the coating. Subsequently, the substrates were placed into an empty petri dish with the coated and inoculated side upwards and incubated under illumination at room temperature for 0 h, 1 h, 2 h, 3 h, 5 h.

For testing of the antimicrobial action through the up-conversion effect, the substrates with the coated and inoculated side were additionally also incubated in the dark at room temperature for 0 h, 1 h, 2 h, 3 h, 5 h.

All samples and the reference without UV up-converter particles were tested in triplicate and with and without illumination over the incubation time.

The antimicrobial effect after the appropriate incubation time is detected via the determination of culturability by a contact test (FIG. 1 of EP 21157055.1).

For the testing of the culturability of *B. subtilis*, the substrates, after the incubation time of 0 h, 1 h, 2 h, 3 h, 5 h. were pressed with the coated and inoculated side against a sterile nutrient agar plate with a defined weight of 90±1 g for 60±5 s. The nutrient agar was then incubated under static conditions at 30° C. for 24±1 h. The bacterial colonies formed were qualitatively assessed visually.

3.2.2 Results of the Transfer Method

Any growth-inhibiting effect on the bacteria can be checked in the transfer method by a decrease in the culturability of *B. subtilis*.

The phosphors according to the invention of Examples 2 and 4 bring about a significant reduction in the culturability of *B. subtilis* in the curable compositions C2-1, C2-2, C4-1 and C4-2 according to the invention compared to CE and the samples incubated in the dark (Table 1). The culturability of the adherent bacteria on the coating surface of the comparative samples of the curable composition CE showed significant growth inhibition with increasing incubation period. This reduction was measurable under constant illumination even after incubation for 1 h. The drop in culturability increases until the incubation time of 5 h under constant illumination. The compositions incubated in the dark did not show any reduction in culturability over the incubation period of 5 h.

By virtue of the unchanged number of culturable bacteria over the period of 5 h on the sample surfaces incubated in the dark, it is possible to show that the antimicrobial effect of the phosphor exists only in the illuminated state.

The curable composition CE without the addition of up-converter particles did not show a growth-inhibiting action on *B. subtilis* either in the illuminated or in the darkened state (Table 1).

The polymeric matrices additionally did not show any genuine contamination. This was checked by a contact test of sample pieces without prior transfer of bacteria thereto.

It can consequently be determined that the fluxed phosphors exhibit an antimicrobial efficacy in the coating according to the invention produced from the curable composition according to the invention.

TABLE 2

| Antimicrobial efficacy of the curable compositions | | |
|---|---|---|
| | Antimicrobial effect | |
| Composition | Illuminated | Darkened |
| CE | No | No |
| C2-1 | Yes | No |
| C2-2 | Yes | No |
| C4-1 | Yes | No |
| C4-2 | Yes | No |

The invention claimed is:

1. A composition for the production of coatings having an antimicrobial property, the composition comprising:
at least one film-forming polymer,
optionally, at least one additive,
optionally, at least one curing agent, and
at least one up-conversion phosphor of the general formula (I)

$$A_{1-x-y-z}B^*_{y}B_2SiO_4{:}Ln^1{}_x,Ln^2{}_z, \quad (I)$$

wherein
$x=0.0001-0.0500;$
$z=0.0000$ or $z=0.0001$ to $0.3000$ with the proviso that: $y=x+z;$
A is selected from the group consisting of Mg, Ca, Sr, and Ba;
B is selected from the group consisting of Li, Na, K, Rb, and Cs;
B* is selected from the group consisting of Li, Na, and K;
$Ln^1$ is selected from the group consisting of praseodymium (Pr), erbium (Er), and neodymium (Nd);
$Ln^2$ is gadolinium (Gd); and
wherein the at least one up-conversion phosphor has been prepared using at least one halogen-containing flux.

2. The composition according to claim 1, wherein the at least one halogen-containing flux is at least one substance selected from the group consisting of an ammonium halide, an alkali metal halide, an alkaline earth metal halide, and a lanthanoid halide.

3. The composition according to claim 2, wherein a halide of the at least one halogen-containing flux is selected from the group consisting of fluoride, bromide, and chloride.

4. The composition according to claim 2, wherein an alkali metal of the alkali metal halide is sodium or lithium.

5. The composition according to claim 2, wherein a lanthanoid of the lanthanoid halide is praseodymium.

6. The composition according to claim 2, wherein an alkaline earth metal of the alkaline earth metal halide is calcium.

7. The composition according to claim 1, wherein the at least one up-conversion phosphor has been doped with praseodymium.

8. The composition according to claim 1, wherein the at least one up-conversion phosphor has been doped with praseodymium and co-doped with gadolinium.

9. The composition according to claim 1, wherein the at least one up-conversion phosphor is a crystalline silicate or consists of crystalline silicates doped with lanthanoid ions, wherein the at least one up-conversion phosphor comprises at least one alkali metal ion and at least one alkaline earth metal ion.

10. The composition according to claim 1, wherein the at least one up-conversion phosphor is at least partially crystalline.

11. The composition according to claim 1, wherein the at least one up-conversion phosphor is a compound of the general formula (Ia)

$$A_{1-x-y-z}B^*_{y}B_2SiO_4{:}Pr_x,Gd_z, \quad (Ia)$$

wherein
A is selected from the group consisting of Mg, Ca, Sr, and Ba;
B is selected from the group consisting of Li, Na, K, Rb, and Cs;
B* is selected from the group consisting of Li, Na, and K;
$x=0.0001-0.0500;$ and
$z=0.0000$ or $z=0.0001$ to $0.3000$ with the proviso that: $y=x+z.$ 12. The composition according to claim 1, wherein the at least one up-conversion phosphor is a compound of the general formula (II)

$$(Ca_{1-a}Sr_a)_{1-2b}Ln_bNa_bLi_2SiO_4 \quad (II)$$

wherein
Ln is selected from the group consisting of praseodymium, gadolinium, erbium, and neodymium;
$a=0.0000$ to $1.0000;$ and
$b=0.0001$ to $0.5000.$ 13. The composition according to claim 1, wherein the at least one up-conversion phosphor is a compound of the general formula (IIa)

$$Ca_{1-2b}Pr_bNa_bLi_2SiO_4 \quad (IIa)$$

wherein $b=0.0001$ to $0.5000.$

14. The composition according to claim 1, wherein the at least one up-conversion phosphor is $Ca_{0.98}Pr_{0.01}Na_{0.01}Li_2SiO_4$ or $Ca_{0.94}Pr_{0.03}Na_{0.03}Li_2SiO_4.$ 15. The composition according to claim 3, wherein the at least one up-conversion phosphor includes a halogen corresponding to the halide of the at least one halogen-containing flux.

16. The composition according to claim 1, wherein the at least one up-conversion phosphor which, on irradiation with electromagnetic radiation having lower energy and longer wavelength in the range from 2000 nm to 400 nm, emits electromagnetic radiation having higher energy and shorter wavelength in the range from 400 nm to 100 nm, where an intensity of an emission maximum of the electromagnetic radiation having higher energy and shorter wavelength is an intensity of at least $1 \cdot 10^3$ counts/(mm²*s).

17. The composition according to claim 12, wherein the at least one up-conversion phosphor according to formula (II) has XRPD signals in the range from 23° 2θ to 27° 2θ and from 34° 2θ to 39.5° 2θ.

18. The composition according to claim 1, wherein the at least one film-forming polymer contains functional groups that are reactive with an isocyanate-containing curing agent or with a catalyst.

19. The composition according to claim 1, wherein the at least one film-forming polymer is selected from the group consisting of a hydroxy-functional acrylate polymer, a hydroxy-functional polyester polymer, a hydroxy-functional polyether polymer, a hydroxy-functional cellulose derivative, an amino-functional aspartic polymer, and a polyester polymer, wherein the at least one film-forming polymer reacts with an isocyanate-containing curing agent.

20. The composition according to claim 1, wherein the at least one film-forming polymer has low resonance.

21. The composition according to claim 1, wherein a transmittance of the at least one film-forming polymer is at least 75%, measured by a twin-beam UV/VIS spectrometer.

22. The composition according to claim 1, wherein a transmittance of the composition is at least 70%, measured by a twin-beam UV/VIS spectrometer.

23. The composition according to claim 1, wherein the at least one up-conversion phosphor has an average particle size of d50=0.1-50 μm, measured to ISO 13320:2020 and USP 429.

24. The composition according to claim 1, wherein the at least one additive is selected from the group consisting of a dispersant, a rheology aid, a levelling agent, a wetting agent, a defoamer, and a UV stabilizer.

25. The composition according to claim 1, wherein the at least one curing agent is selected from the group consisting of an aliphatic isocyanate and a cycloaliphatic isocyanate.

26. The composition according to claim 1, wherein a coating produced therefrom has antimicrobial action against bacteria, yeasts, moulds, algae, parasites, and viruses.

27. The composition according to claim 1, wherein a coating produced therefrom has antimicrobial action against pathogens of nosocomial infections, pathogenic environmental organisms, or pathogens in food and drink.

28. A method, comprising:

coating a substrate with the composition according to claim 1, wherein the substrate is for a hygiene facility, a hospital, or for the food and drink industry.

29. An article, coated at least partly with the composition according claim 1.

\* \* \* \* \*